United States Patent

[11] 3,534,763

[72] Inventor Frank A. Lucardie
    4153 N. Walnut St., Baldwin Park,
    California 91706
[21] Appl. No. 752,109
[22] Filed June 28, 1968
[45] Patented Oct. 20, 1970

[54] INLINE VALVE
    5 Claims, 7 Drawing Figs.
[52] U.S. Cl. .................................................. 137/219,
    137/614.2
[51] Int. Cl. ............................................. F16k 31/143,
    F16k 15/03
[50] Field of Search .......................................... 137/495,
    496, 493.9, 494, 466, 484.4, 489.3, 489.5, 219,
    220, 614.2, 505.25; 251/62, 31, 61.2

[56]                References Cited
            UNITED STATES PATENTS
765,849   7/1904  Merrill ..................... 137/505.25X
2,690,761 10/1954 Gray ........................ 137/495
3,322,138 5/1967  Backman ................ 137/219

FOREIGN PATENTS
969,077  12/1950  France ........................ 137/219

Primary Examiner—M. Cary Nelson
Assistant Examiner—R. B. Rothman
Attorney—Boniard I. Brown ABSTRACT: An inline valve having a barrel containing a tubular plunger and valve operating means such as coacting linear fluid pressure actuator means on the barrel and plunger, for selectively moving the plunger longitudinally toward one end of the barrel to an open position and toward the opposite end of the barrel to a closed position. The plunger contains a longitudinal flow passage which communicates fluid inlet and outlet ports in the ends, respectively, of the barrel when the plunger occupies its open position. Coacting sealing means are provided on the plunger and barrel for blocking flow through the valve when the plunger occupies its closed position. For low-pressure applications, the plunger may be sealed to the barrel by corrugated bellows which extend coaxially between and are terminally sealed to the ends of the plunger and barrel in such a way that the bellows compress and extend longitudinally during movement of the plunger between its opened and closed positions.

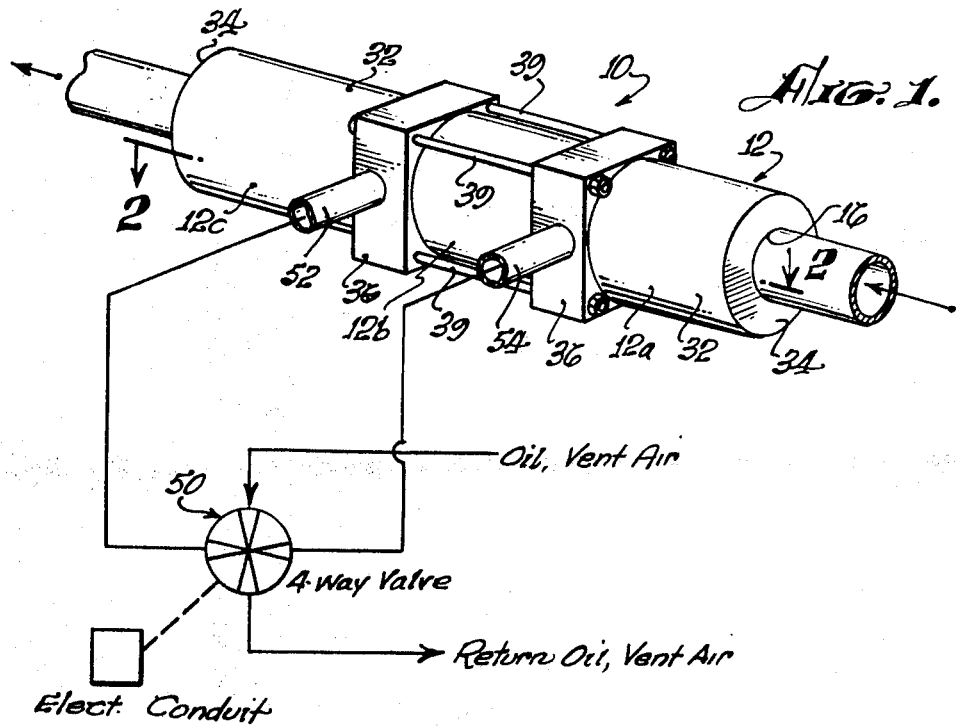
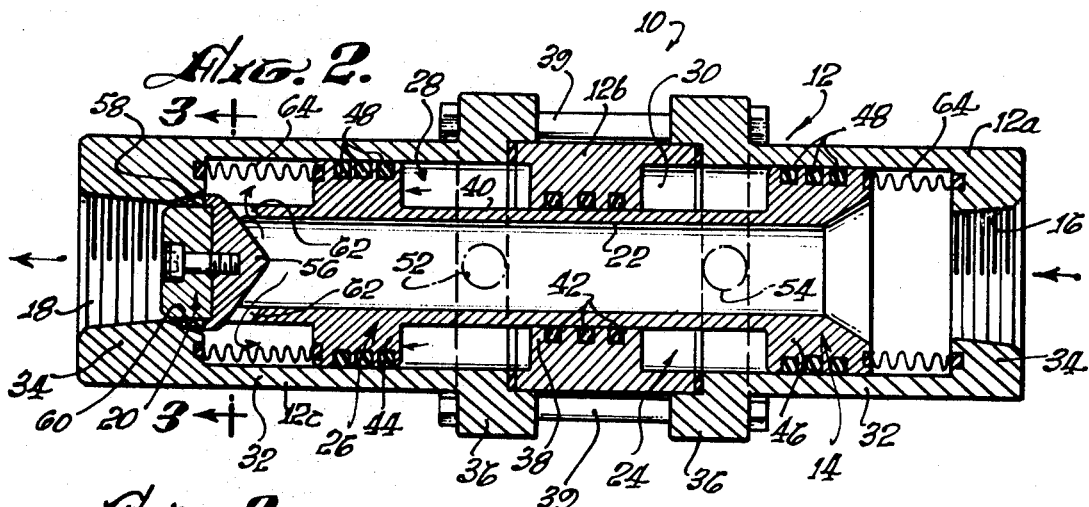
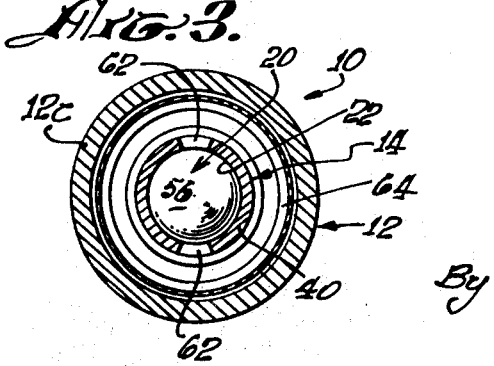
INVENTOR
FRANK A. LUCARDIE,
By Bernard J. Brown
ATTORNEY.

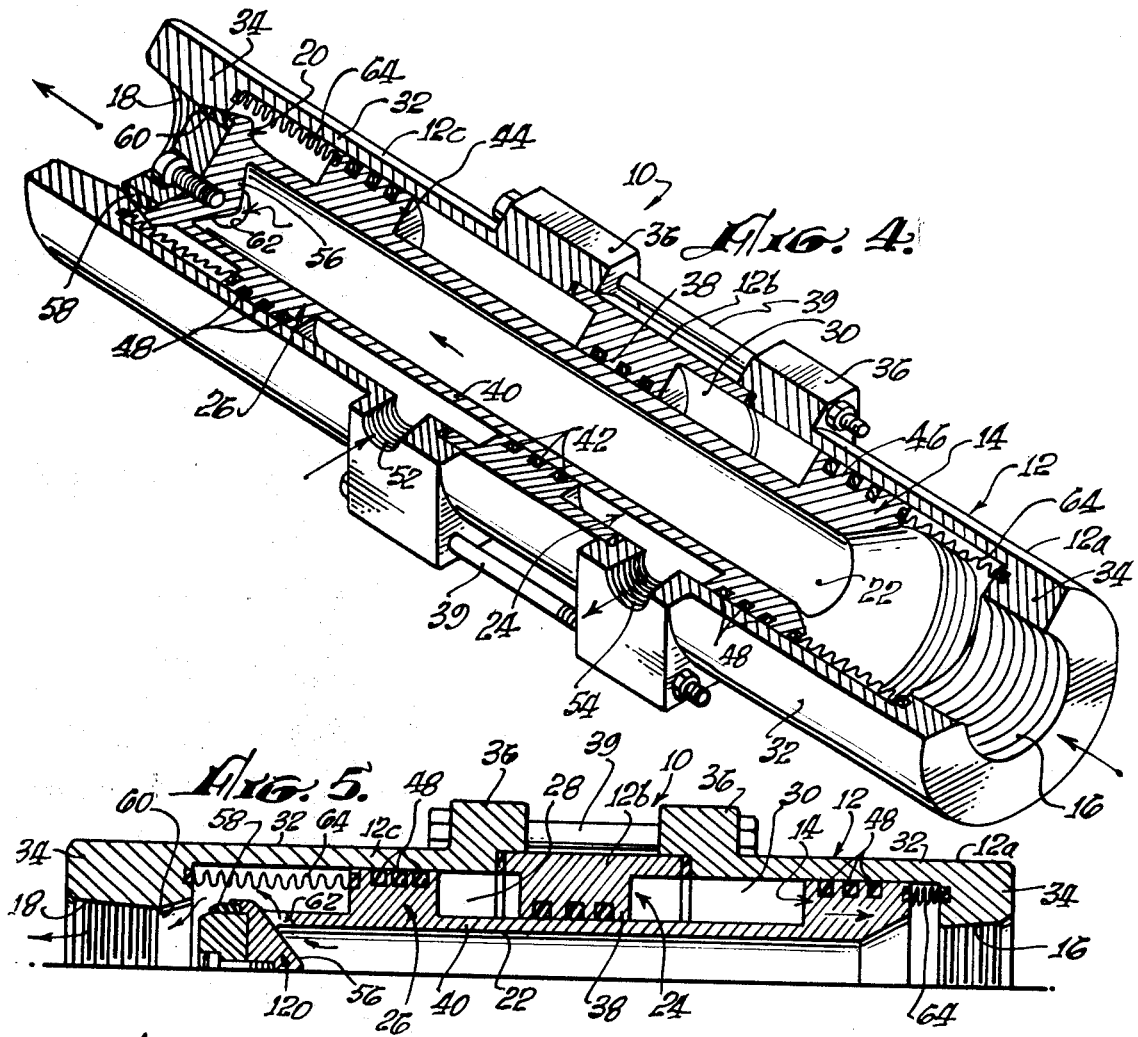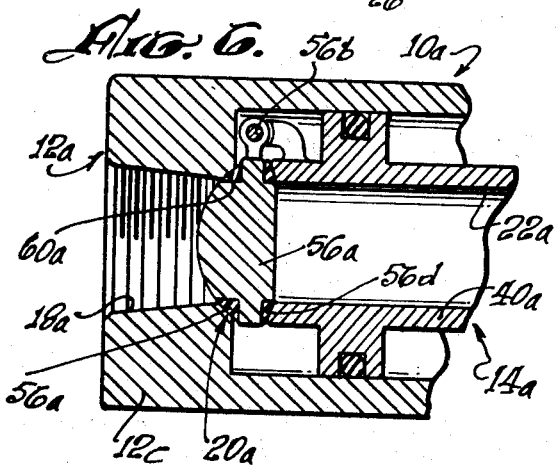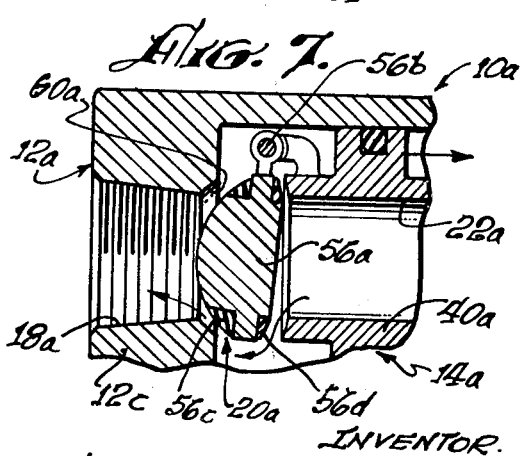
INVENTOR.
FRANK A. LUCARDIE,
By
Bernard L. Brown
ATTORNEY.

INLINE VALVE

BACKGROUND OF THE INVENTION

1. Field of the Invention

This invention relates generally to valves and more particularly to a novel inline valve.

2. Description of the Prior Art

A great variety of valves have been devised for controlling fluid flow through conduits. The existing valves, however, are characterized by various deficiencies which detract from their usefulness. Many existing valves, for example, have an externally extending valve operating stem which must be sealed to the valve body by means of a seal ring, packing or the like. This stem seal is subject to wear and/or deterioration and thus must be periodically replaced. Accordingly, such a stem seal constitutes a major deficiency of such valves. Other existing valves eliminate the need for a stem seal by employing a hermetically sealed valve member construction in which the valve member is moved between its open and closed positions by fluid pressure or electromagnetic force. The existing valves of this latter type, however, as well as many of the existing stem valves, present substantial resistance to flow and hence cause undesirable pressure loss in the fluid being controlled.

SUMMARY OF THE INVENTION

The present invention provides a novel hermetically sealed inline valve which avoids both of the above-noted and other known deficiencies of the existing valves. To this end, the present valve is characterized, in general terms, by a barrel containing a tubular plunger which is movable longitudinally toward one end of the barrel to an open position and toward the opposite end of the barrel to a closed position. Located at opposite ends of the barrel are fluid inlet and outlet ports, respectively. When the valve plunger occupies its open position, the inlet and outlet ports communicate through a longitudinal flow passage in the plunger. The plunger and barrel are provided with coacting sealing means for blocking flow through the valve when the plunger occupies its closed position. In the disclosed embodiment of the invention, for example, at least one port of the barrel is disposed on the common longitudinal axis of the barrel and plunger and is surrounded by the valve seat which faces the adjacent end of the plunger. This end of the plunger mounts a valve head which engages the valve seat when the plunger occupies its closed position. Preferably, the other valve port is also located on the common longitudinal axis of the barrel and plunger in such a way that fluid undergoes essentially uninterrupted straight longitudinal flow through the valve from its inlet port to its outlet port.

The valve is also equipped with operating means for selectively shifting the valve plunger between its open and closed positions. As will appear from the ensuing description, various operating means, including both fluid pressure and electromagnetic means, may be utilized for this purpose. In the disclosed embodiment of the invention, the valve-operating means comprise external piston means on the plunger which slide within the barrel and define with the barrel pressure chambers which may be selectively pressurized with a working fluid, either a gaseous or a liquid fluid, for shifting the plunger longitudinally between its open and closed positions.

The plunger may be sealed to the barrel in any convenient way to prevent fluid leakage between the barrel and plunger. According to a feature of the invention, however, when the valve is designed for low-pressure fluid systems, the plunger is sealed to the barrel by means of corrugated bellows. These bellows extend coaxially between and are terminally sealed to the ends of the plunger and barrel, respectively, in such a way that the bellows undergo longitudinal compression and extension during movement of the plunger between its open and closed positions.

The valve may be arranged in such a way that the valve plunger either opens or seats against fluid pressure. The valve may be designed for use as a shutoff valve only or as a com- operating means may be eliminated to permit the valve to function solely as a check valve.

BRIEF DESCRIPTION OF THE DRAWINGS

FIG. 1 is a perspective view of an inline valve according to the invention illustrating in diagrammatic fashion external forming for operating the valve plunger between its open and closed positions;

FIG. 2 is an enlarged longitudinal section through the valve, taken on line 2–2 in FIG. 1, illustrating the valve plunger in its closed position;

FIG. 3 is a section taken on line 3–3 in FIG. 2;

FIG. 4 is an enlarged longitudinal perspective section through the valve;

FIG. 5 is a fragmentary longitudinal section through the valve illustrating the valve plunger in its open position;

FIG. 6 is a fragmentary longitudinal section through a modified valve having an alternate type of sealing means for sealing the plunger to the barrel when the plunger occupies its closed position; and FIG. 7 is a view similar to FIG. 6 showing the valve plunger in its open position.

DESCRIPTION OF THE PREFERRED EMBODIMENT

Turning now to FIGS. 1 through 5 of these drawings, there is illustrated an inline valve 10 according to the invention having a barrel 12 containing a plunger 14. Barrel 12 has an inlet port 16 at one end and an outlet port 18 at the opposite end. Valve plunger 14 is movable longitudinally toward one end of the barrel 12 to its closed position of FIG. 2 and toward the opposite end of the barrel to its open position of FIG. 5. Extending longitudinally through the valve plunger 14 is a central flow passage 22 which communicates the inlet port 16 and outlet port 18 when the plunger occupies its open position of FIG. 5.

Operating means 24 are provided for shifting the valve plunger 14 between its open and closed positions. As noted earlier, various operating means may be employed for this purpose, including both fluid pressure and electromagnetic means. The particular valve-operating means illustrated comprise fluid pressure actuated means including piston means 26 on the plunger 14 which define with the barrel 12 a pair of pressure chambers 28 and 30. As will appear presently, these pressure chambers may be selectively pressurized, by an external pressurizing system 32, to shift the valve plunger between its open and closed positions.

Briefly, in operation of the valve 10, the latter is closed by operating the external pressurizing system 32 to shift the valve plunger 14 to its closed position of FIG. 2, wherein the sealing means 20 engage to block flow through the valve from its inlet port 16 to its outlet port 18. The valve is opened by operating the pressurizing system to shift the valve plunger to its open position of FIG. 5. In this open position, flow occurs from the inlet port 16, through the longitudinal plunger passage 22, to the outlet port 18. A significant feature of the invention resides in the fact that fluid undergoes essentially straight longitudinal flow through the valve, when open, whereby only minimal pressure drop occurs in the fluid. Moreover, the valve is hermetically sealed, thus eliminating the need for stem seals and other external seals which are prone to wear and leakage.

Referring now in greater detail to the embodiment of the invention which has been selected for illustration in the drawings, the valve barrel 12 is composed of three parts, to wit, a right-hand end section 12a, a central section 12b, and a left-hand end section 12c. The right- and left-hand end sections 12a, 12c are similar and each includes a cylindrical wall 32 closed at one end by an end wall 34 and surrounded at its other end by an annular flange 36. The inlet and outlet ports 16, 18 extend coaxially through the end walls 34. These ports may be internally threaded, as shown, for connection to fluid conduits for conveying fluid to and from the valve. The central section 12b of the barrel is essentially a tube having an internal annular shoulder or flange 38. This central barrel section is coaxially disposed between the inner flanged ends of the outer barrel sections 12a, 12c. The outer barrel section flanges 36 are recessed to receive the ends of the central barrel section and are sealed to the latter section by gaskets, as shown. The three barrel sections 12a, 12b and 12c are secured in assembled relation by tie bolts 39 which extend through the flanges 36.

The valve plunger 14 has a central sleeve 40 which extends the full length of the plunger and slidably through the central opening in the central internal barrel shoulder 38. Seals 42 are provided for sealing the barrel shoulder 38 to the plunger sleeve 40. The piston means 26 on the plunger comprise a pair of pistons 44, 46 which coaxially surround and are formed integrally with the plunger sleeve 40. The plunger piston 44 is located a short distance from the left-hand end of the barrel sleeve 40 and is disposed between the left-hand barrel end wall 34 and the central barrel shoulder 38. The plunger piston 46 is located at the right-hand extremity of the plunger sleeve 40 and is disposed between the right-hand barrel end wall 34 and the central barrel shoulder 38. These pistons are sealed to the inner wall of the barrel by seal rings 48. The pistons define with the central barrel shoulder 38 the pressure chambers 28 and 30, respectively.

The external pressurizing system 50 for activating the valve operating means 24 forms no part of the present invention and thus need not be explained in detail. Suffice it to say that this external pressurizing system has a selector valve 50 which may be operated to selectively communicate either pressure chamber 28 or 30 of the inline valve 10 to a fluid pressure source and to vent the other pressure chamber. The selector valve may be electrically operated and communicates to the pressure chambers 28, 30 through fluid connections 52, 54 on the valve barrel 12. Operation of the selector valve 50 to pressurize the chamber 28 and vent the chamber 30 of the inline valve 10 drives the valve plunger 14 to its closed position of FIG. 2. Operation of the selector valve to pressurize chamber 30 and vent chamber 28 drives the plunger to its open position of FIG. 5.

The sealing means 20 of the illustrated inline valve 10 comprise a valve head 56 which is integrally formed on, welded to, or otherwise provided on one end of the valve plunger 14. This valve head carries a seal ring 58 which is engageable with a valve seat 60 surrounding the adjacent valve barrel port. In this regard, it is significant to recall that the present valve may either open or close against fluid pressure. The particular valve illustrated opens against fluid pressure. In this case, the valve head 56 is located at the end of the plunger 14 adjacent the outlet port 18 of the valve barrel 12, and the valve seat 60 surrounds the latter port. Extending through the valve sleeve 40, in the region between the valve head 56 and the adjacent plunger piston 44, are a number of flow ports 62. It is now evident that when the valve plunger 14 occupies its open position of FIG. 5, flow through the valve occurs from the inlet port 16, through the central flow passage 22 in the plunger, then through the plunger ports 62 into the annular flow space between the adjacent end of the plunger and the barrel 12, and then between the valve head seal 58 and valve seat 60 to the outlet port 18. Movement of the plunger to its closed position engages the valve seal 58 with the valve seat 60 to block flow through the valve. It will be obvious, of course, that if it is desired to have the valve close against fluid pressure, the inlet and outlet connections to the valve are simply reversed.

For low-pressure applications, the valve plunger 14 may be sealed to the valve barrel 12 by means of a pair of corrugated bellows 64. These bellows are dimensioned to fit closely within the barrel and are coaxially disposed between the barrel end walls 34 and their respective adjacent plunger pistons 44, 46. The ends of the bellows are brazed or otherwise sealed to the barrel end walls and pistons. It will be observed that these bellows undergo longitudinal extension and contraction during movement of the valve plunger 14 between its open Turning now to FIGS. 6 and 7, there is illustrated a modified inline valve 10a according to the invention. This modified valve is essentially identical to the inline valve just described except for the sealing means 20a for sealing the plunger 14a to the barrel 12a when the plunger occupies its closed position of FIG. 6. In this case, the sealing means comprise a valve head 56a which is separate from the plunger and is hinged to the plunger by means of a pivotal connection 56b so that the head may swing about a transverse axis of the plunger. The valve head 56a has a first seal 56c facing and engageable with the valve seat 60a on the barrel 12a. The valve head has a second seal 56d which faces and is engageable with the adjacent end of the valve sleeve 40a. The modified valve is otherwise identical to the earlier valve, except that the valve ports 62 of the latter valve are eliminated and the longitudinal passage 22a in the plunger 14a opens through the end of the plunger, as shown.

When the plunger 14a of the modified inline valve 10a is shifted to its closed position of FIG. 6, the pivotal valve head 56a is effectively clamped between the adjacent end of the plunger sleeve 40a and the valve seat 60a. The head seal 56c engages the valve seat and the head seal 56d engages the adjacent end of the plunger sleeve to block flow through the valve. Movement of the plunger 14a to its open position releases the valve head 56a to swing away from the plunger sleeve 40a, under the action of fluid pressure, whereby fluid may flow from the plunger passage 22a, around the valve head, to the valve outlet port 18a, as shown.

At this point, it is significant to recall that the present inline valve may be employed as a shutoff valve only, a combined shutoff and check valve, or a check valve only. When the valve is to operate only as a shutoff valve, it may be connected in a fluid system in such a way as to either open or close against fluid pressure. If the valve is to operate as a combined shutoff and check valve, on the other hand, it is arranged to close against the normal flow through the valve, whereby such flow will retain the valve open while reverse flow will shift the valve plunger to its closed position. The valve is connected in the same way when it is to operate only as a check valve. In this case, however, the valve operating means 24 may be eliminated.

While the invention has been disclosed in connection with certain of its physical embodiments, it is obvious that various modifications of the invention are possible within the spirit and scope of the following claims.

I claim:

1. A valve comprising:
   a barrel having end walls, flow ports extending coaxially through said end walls, a valve seat about one of said ports, and an internal annular shoulder intermediate said end walls;
   a tubular plunger movable longitudinally in said barrel including a sleeve having an external diameter substantially smaller then the internal diameter of said barrel, annular pistons on said sleeve at opposite sides of said shoulder, and a longitudinal flow passage extending through and opening to the ends of said sleeve;
   said plunger being movable longitudinally in the direction of said valve seat to a closed position wherein said valve head engages said seat and in the opposite direction to an open position wherein said valve head is spaced from said valve seat;
   said barrel shoulder and one plunger piston defining therebetween a first pressure chamber, and said shoulder and the other piston defining therebetween a second pressure chamber; and
   fluid connections on said barrel communicating with said wherein
   chambers, respectively, through which said chambers may be selectively pressurized and vented to move said plunger between its open and closed positions.

2. A valve according to claim 1 wherein said valve head is rigidly joined to said plunger sleeve and said plunger sleeve contains ports directly behind said valve head communicating said plunger passage to the annular space between said plunger sleeve and said barrel in the region between said valve head and the adjacent plunger piston.

3. A valve according to claim 1 wherein:

said valve head is pivotally mounted on the adjacent end of said plunger sleeve for swinging on a transverse axis of said plunger;

said plunger passage opens longitudinally through said adjacent sleeve end; and said valve head is engageable with said valve seat and said adjacent sleeve end when said plunger occupies its closed position.

4. A valve comprising:

a barrel having a first fluid port at one end and a second fluid port at the opposite end;

a tubular plunger movable longitudinally in said barrel and containing a central flow passage opening longitudinally through the end of said plunger adjacent said second port;

said second port being coaxially disposed on the common axis of said barrel and plunger and said barrel having a valve seat surrounding said second port;

said plunger being movable longitudinally toward said one end of said barrel to an open position wherein said ports communicate through said flow passage and toward said opposite end of said barrel to a closed position;

a valve head pivoted on said end of said plunger for swinging on a transverse axis of said plunger; and said valve head being engageable with both said valve seat and said one end of said plunger about the adjacent open end of said passage when said plunger occupies its closed position.

5. A valve comprising:

a barrel having a first fluid port at one end and a second fluid port at the opposite end;

a tubular plunger movable longitudinally in said barrel and containing a central flow passage extending longitudinally through said plunger;

said plunger being movable longitudinally toward one end of said barrel to an open position wherein said ports communicate through said flow passage and toward the opposite end of said barrel to a closed position;

coacting sealing means on one end of said plunger and the adjacent end of said barrel for blocking flow between the adjacent port and said passage when said plunger occupies its closed position;

said plunger comprises a sleeve having an external diameter substantially less than the internal diameter of said barrel and a pair of external annular pistons surrounding said sleeve adjacent the ends thereof and disposed in fluid sealing relation to said barrel;

said barrel comprising an internal annular shoulder intermediate the ends of the barrel surrounding and disposed in fluid sealing relation to said plunger sleeve between said pistons;

said shoulder and pistons defining fluid pressure chambers which may be selectively pressurized and vented to move said plunger in either longitudinal direction in said barrel; and fluid connections on said barrel for selectively pressurizing and venting said chambers.